United States Patent
Kim et al.

(10) Patent No.: US 6,556,422 B2
(45) Date of Patent: Apr. 29, 2003

(54) DIELECTRIC CERAMIC COMPOSITION, MULTI-LAYER CERAMIC CAPACITOR USING THE SAME, AND MANUFACTURING METHOD THEREFOR

(75) Inventors: Han Gyun Kim, Suwon (KR); Seong Won Cho, Suwon (KR); Seong Un Ma, Suwon (KR); Kang Heon Her, Suwon (KR); Jong Yeon Lee, Suwon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 09/861,290

(22) Filed: May 18, 2001

(65) Prior Publication Data

US 2002/0074154 A1 Jun. 20, 2002

(30) Foreign Application Priority Data

Jul. 5, 2000 (KR) ......................... 2000-38373
Jul. 5, 2000 (KR) ......................... 2000-38374

(51) Int. Cl.$^7$ ................................................. H01G 4/06
(52) U.S. Cl. .............................. 361/321.2; 361/321.1; 361/321.5; 361/311; 361/313; 361/320; 501/138; 501/139
(58) Field of Search ........................ 361/321.2, 311, 361/306.1, 321.5, 321.1, 321.3, 313, 312, 310, 320, 306.3, 328; 501/138, 139

(56) References Cited

U.S. PATENT DOCUMENTS

| | | | |
|---|---|---|---|
| 5,036,424 A | * | 7/1991 | Yokotani et al. |
| 5,335,139 A | | 8/1994 | Nomura et al. |
| 5,362,693 A | | 11/1994 | Chu et al. |
| 5,403,797 A | | 4/1995 | Ohtani et al. |
| 5,600,533 A | | 2/1997 | Sano et al. |
| 5,646,080 A | | 7/1997 | Chu et al. |
| 5,668,694 A | | 9/1997 | Sato et al. |
| 5,801,111 A | * | 9/1998 | Wada et al. |
| 5,858,901 A | | 1/1999 | Chu et al. |
| 5,862,034 A | * | 1/1999 | Sato et al. |
| 5,877,934 A | | 3/1999 | Sano et al. |
| 6,008,981 A | | 12/1999 | Harada et al. |
| 6,051,516 A | * | 4/2000 | Mizuno et al. |
| 6,243,254 B1 | * | 6/2001 | Wada et al. |

FOREIGN PATENT DOCUMENTS

KR    2000-0017250    5/2000

* cited by examiner

Primary Examiner—Chau N. Nguyen
Assistant Examiner—Nguyen Ha
(74) Attorney, Agent, or Firm—Renner, Otto, Boisselle & Sklar, LLP

(57) ABSTRACT

A dielectric ceramic composition, a multi-layer ceramic capacitor and a manufacturing method characterized by superior dielectric properties. The ceramic capacitor includes a chip having a plurality of dielectric layers, a plurality of internal electrodes stacked alternately with the dielectric layers, and a pair of outer electrodes formed on both sides of the chip, with the composition of the dielectric layers including: 100 moles of barium calcium titanate $BaCa_xTiO_3$ ($0.001 \leq x \leq 0.02$), 0.5–4 moles of MgO, 0.01–0.5 moles of MnO, 0.1—2 moles of BaO, 0.1–2 moles of CaO, 1–4 moles of $SiO_2$, and 0.1–3 moles of at least one or more compounds selected from the group consisting of $Y_2O_3$, $Dy_2O_3$, $Ho_2O_3$ and $Er_2O_3$. The capacitor thus manufactured satisfies the X7R standard and has superior dielectric properties, and the deviations of the dielectric properties are extremely low, thereby ensuring a high reliability.

21 Claims, 1 Drawing Sheet

DIELECTRIC CERAMIC COMPOSITION, MULTI-LAYER CERAMIC CAPACITOR USING THE SAME, AND MANUFACTURING METHOD THEREFOR

FIELD OF THE INVENTION

The present invention relates to a dielectric ceramic composition, a multi-layer ceramic capacitor using the same, and more particularly to a dielectric ceramic composition having superior dielectric properties, a multi-layer ceramic capacitor using a nickel or nickel alloy as internal electrodes, and manufacturing method therefor.

BACKGROUND OF THE INVENTION

As shown in FIG. 1, the multi-layer ceramic capacitor generally includes a ceramic chip having a plurality of ceramic dielectric layers 2a and 2b and a plurality of internal electrodes 3, in which the dielectric layers and the internal electrodes are alternately stacked, and a pair of external electrodes 4 electrically connected to both sides of said ceramic chip. The internal electrodes are made of a base metal such as Ni or Ni alloys instead of the expensive metals such as Ag, Pd and the like to reduce the cost of manufacturing multi-layer ceramic capacitors.

Recently, the progress of the electronic technology has promoted the miniaturization of the electronic components, and there is a trend for the multi-layer ceramic capacitors to become larger in capacitance and better in thermal stability for its capacitance. Such a requisite is same in the multi-layer ceramic capacitor with the Ni electrodes. If the multi-layer ceramic capacitor with the Ni electrodes is to meet the requisites of large capacitance and miniaturization, the dielectric layer has to be thinner and has to consist of more multiple layers. However, in the conventional dielectric materials, when the dielectric layers are made very thin, the layers are applied by higher voltage even with the same voltage, resulting in lower dielectric constant, the aggravation of the temperature dependence of the capacitance, and the deterioration of other properties. Particularly, if the thickness of the dielectric layer is reduced down to 5 $\mu$m, the number of the ceramic grains present between the internal electrodes is reduced to 10 or less, and therefore, a high stability cannot be expected.

Meanwhile, conventionally barium titanate has been used as the dielectric layer. The typical examples are disclosed in U.S. Pat. Nos. 5,335,139, 5,362,693, 5,403,797, 5,600,533, 5,646,080, 5,668,694, 5,858,901, 5,862,034, 5,877,934 and 6,008,981. However, if barium titanate is sintered under a reducing atmosphere, it becomes a semiconductor during the sintering. Anti-reduction shells therefore are required to be formed on the surfaces of all the grains of the barium titanate. Otherwise the insulating properties might be aggravated, while the life expectancy would be drastically reduced. Further, even if the shells with high insulation resistance are formed, when their thickness is thin, then barium titanate becomes a semiconductor, with the result that the insulating properties are aggravated, as well as shortening the life expectancy. Accordingly, if the capacitor is to be manufactured with a dielectric composition in which the main ingredient is barium titanate, then much time and expense are required to make the composition uniform.

In order to solve this problem, Korean Patent Laid-open No. 2000-17250 discloses a capacitor in which barium calcium titanate with the anti-reduction properties greatly improved is used as the starting material, and the electrodes are made of Ni. Barium calcium titanate has a high anti-reduction property owing to the fact that Ti is replaced with Ca, thereby creating a lattice defect. Accordingly, barium calcium titanate can maintain a high insulating resistance even if the shells cannot be formed during the sintering or even if the shells are thinly formed. A multi-layer ceramic capacitor with the electrodes of Ni in the above cited Korean Patent Laid-open is made of a dielectric composition in which the starting material is $(Ba_{1-x}Ca_x)_mTiO_2$, and the minor ingredient is a glass oxide. Thus the drop of the dielectric constant is low, and the temperature characteristics meet the X7R of the EIA standard. Further, in another dielectric ceramic capacitor of the above cited Korean patent application, one or more of the rare earth metals Re is contained in $(Ba_{1-x}Ca_x)_mTiO_2$ where Re is Y, Gd, Th, Dy, Ho, Er or Yb. Thus owing to the diffusion during the sintering, core shells with the rare earth metal components are formed on or near the grain boundaries.

The multi-layer ceramic capacitors that contain glass component in the dielectric layer as one of miner ingredients show their high insulating resistance. However, glass component in such capacitors may affect the diffusion rate of the other composition which are diffused into their cores and form low dielectric constant shells. Accordingly, this capacitors show rather a low dielectric property. Particularly, in the above cited patent application, the minor ingredient is sintering agents such as $Li_2O$—$(Si, Ti)O_2$—MO oxide (where MO is at least one selected from among $Al_2O_3$ and $ZrO_2$), or $SiO_2$—$TiO_2$—XO oxide (where XO is at least one selected from the group consisting of BaO, CaO, SrO, MgO, ZnO and MnO), or $Li_2O$—$B_2O_3$—$(Si, Ti)O_2$, or $Al_2O$—MO—$B_2O_3$ (where MO is at least one selected from the group consisting of BaO, CaO, SrO, MgO, ZnO, and MnO). However, such sintering agents exist in liquid phase at a low temperature, and therefore, most of them shows a dielectric constant of less than 2000, thereby making it impossible to provide a reliable multi-layer ceramic capacitor. Further, in order to meet the X7R, if the product is manufactured by individually mixing a plurality of minor ingredients to the main ingredient, the shell ingredients can become diverse, and therefore, the deviation of the electrical properties is enlarged, with the result that the yield is decreased.

SUMMARY OF THE INVENTION

The present invention is intended to overcome the above-mentioned disadvantages of the conventional techniques.

Therefore it is an object of the present invention to provide a dielectric ceramic composition in which $BaCa_xTiO_3 (0<x\leq0.02)$ with a superior anti-reduction property is used, and the diffusion rate within the dielectric ceramic chip is more efficiently controlled, so that the X7R standard can be met, and that the dielectric properties would be superior.

It is another object of the present invention to provide a multi-layer ceramic capacitor in which the above described dielectric ceramic composition and Ni electrodes are used.

It is still another object of the present invention to provide a method for manufacturing the multi-layer ceramic capacitor in which the deviation of the dielectric properties is small.

In achieving the above objects, the dielectric ceramic composition according to the present invention includes:

100 moles of barium calcium titanate $BaCa_xTiO_3$ ($0.001\leq x\leq0.02$), 0.5–4 moles of Mg, 0.01–0.5 moles of MnO, 0.1–2 moles of BaO,
0.1–2 moles of CaO,
1–4 moles of SiO$_2$ and
0.1–3 moles of at least one or more compounds selected from the group consisting of Y$_2$O$_3$, Dy$_2$O$_3$, Ho$_2$O$_3$ and Er$_2$O$_3$.

In another aspect of the present invention, the dielectric ceramic composition can include 0.4 moles or less of V$_2$O$_5$ and/or Cr$_2$O$_3$.

In still another aspect of the present invention the multi-layer ceramic capacitor according to the present invention includes:

a plurality of dielectric ceramic layers composed of the above dielectric ceramic composition;

a plurality of internal electrodes disposed on the dielectric ceramic layers, the internal electrodes and the dielectric ceramic layers being alternately stacked to form a stacked chip; and a pair of external electrodes formed on both sides of the stacked chip.

In still another aspect of the present invention, the method for manufacturing a multi-layer ceramic capacitor according to the present invention includes the steps of:

preparing ceramic powders comprising
0.5–4 moles of MgO,
0.01–0.5 moles of MnO,
0.1–2 moles of BaO,
0.1–2 moles of CaO,
1–4 moles of SiO$_2$ and
0.1–3 moles of at least one or more compounds selected from the group consisting of Y$_2$O$_3$, Dy$_2$O$_3$, Ho$_2$O$_3$ and Er$_2$O$_3$, per 100 moles of barium calcium titanate BaCa$_x$TiO$_3$ (0.001≦x≦0.02), wherein at least two or more kinds of the ceramic powders are mixed and calcined;

crushing the calcined powders, mixing the calcined powders and remaining powders with barium calcium titanate, and adding a binder and a solvent so as to form a slurry;

forming the slurry into a plurality of sheets, and printing Ni or an Ni alloys onto some of the sheets so as to form internal electrodes;

stacking alternately the sheets with and without the internal electrodes, whereby a stacked chip is formed, and sintering the chip; and disposing a pair of external electrodes on both sides of the stacked chip so as to be connected to said internal electrodes, whereby a multi-layer ceramic capacitor with a low deviation of dielectric properties is formed.

BRIEF DESCRIPTION OF THE DRAWINGS

The above objects and other advantages of the present invention will become more apparent by describing in detail the preferred embodiment of the present invention with reference to the attached drawings in which.

DESCRIPTION OF THE PREFERRED EMBODIMENT

Figure 1:
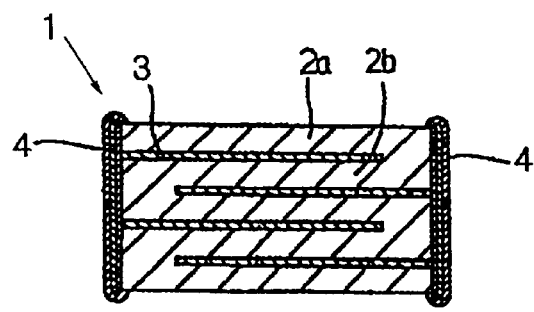
FIG. 1 is a sectional view of the multi-layer ceramic capacitor.
Figure 2:
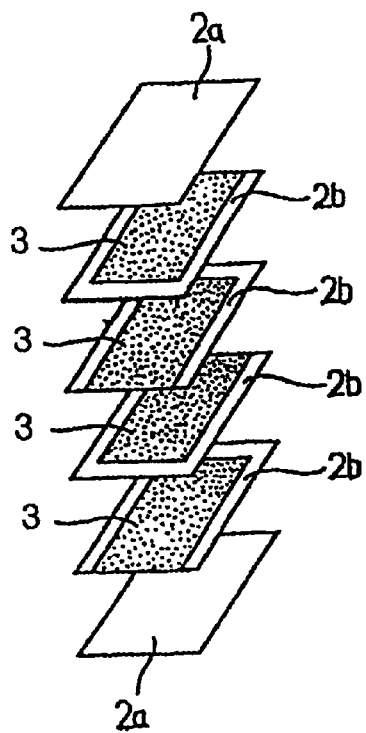
FIG. 2 is an exploded perspective view of the ceramic dielectric layer of FIG. 1.

The dielectric ceramic composition according to the present invention includes: a main ingredient system consisting of BaCa$_x$TiO$_3$, MgO and MnO; a Wintering agent consisting of Ba, Ca and Si; and one or more components selected from the group consisting of Y$_2$O$_3$, Dy$_2$O$_3$, Ho$_2$0$_3$ and Er$_2$O$_3$.

In the dielectric composition of the present invention, barium calcium titanate for forming a core shell structure is used, and therefore, the dielectric properties are improved compared with the conventional case in which only barium titanate is used. Further, in the present invention, Ba, Ca and Si are diffused into the shells of barium calcium titanate. Thus the dielectric composition in the present invention greatly improves the insulating properties and can satisfy the X7R specification compared with the case where only glass frit is added to barium calcium titanate.

For this purpose, in the main ingredient BaCa$_x$TiO$_3$, x is preferably a value of 0.001–0.02. This range is advantageous for improving the anti-reduction property of barium calcium titanate.

One of the main ingredients, i.e., MgO makes sure that the variations of the capacitance of the capacitor with respect to the temperature meet the X7R standard. If MgO is contained too small, the variations of the capacitance is increased, while if it is contained too much, the sintering of the capacitor becomes difficult. For this reason, MgO is contained in an amount of 0.5–4 moles, preferably 0.5–3 moles per 100 moles of barium calcium titanate.

The MnO component affects the percent change of the insulating resistance and the capacitance with respect to time under a DC electric field. If MnO is obtained too small, the insulating resistance of the capacitor is lowered. On the other hand, if it is added too much, the percent change of the capacitance with respect to time is increased, in addition that it makes the sintering of the capacitor difficult. Therefore, the contents of MnO is preferably 0.01–0.5 moles, more preferably 0.05–0.2 moles per 100 moles of barium calcium titanate.

The component BaO which promotes the sintering of the dielectric composition makes it possible to control the rate of the diffusion of the composition forming shell to barium calcium titanate. Further, BaO remains on the shells to improve the dielectric properties and the insulating resistance.

In the present invention, the content of BaO is preferably 0.1–2.0 moles per 100 moles of barium calcium titanate. If the content of BaO is too low, the insulating resistance of the capacitor is decreased, while if its content is too high, the sintering of the capacitor becomes difficult. The content of BaO is more preferably 0.5–1.5 moles per 100 moles of barium calcium titanate.

In the dielectric ceramic composition, it is advantageous that CaO is added with BaO and SiO$_2$ as a sintering agent. Like BaO, the component CaO controls the fate of the diffusion of composition form the shell to barium calcium titanate. Further, it remains on the shells to improve the dielectric properties and the insulating resistance. The content of CaO is preferably 0.1–2.0 moles per 100 moles of barium calcium titanate. If the content of CaO is less than the lower limit, then the insulating resistance is lowered, while if its content exceeds the upper limit, then the sintering of the capacitor becomes difficult. More preferably, the content of CaO is 0.5–1.5 moles per 100 moles of barium calcium titanate.

Another sintering agent, i.e., SiO$_2$ component carries the composition forming shells to the shells, a part of barium calcium titanate, so as to make them stay there. The content of SiO$_2$ is preferably 1–4 moles per 100 moles of barium calcium titanate. If its content is too less, the sintering of the capacitor becomes difficult, while if it is added too much, the insulating resistance is decreased. More preferably, the content of $SiO_2$ is 1.5–3 moles per 100 moles of barium calcium titanate.

The components $Y_2O_3$, $Dy_2O_3$, $Ho_2O_3$ and $Er_2O_3$ contribute to extending the average accelerated age of the capacitor. Each of the above components is added in an amount of 0.1–3 moles per 100 moles of barium calcium titanate. If each of the above components is added too small, the life expectancy is shortened and the DC bias characteristics are aggravated. On the other hand, if each of the above components is added too much, not only the dielectric constant is lowered, but also the sintering becomes difficult. More preferably the content of each of the above components is 0.5–2 moles per 100 moles of barium calcium titanate.

Further, in the dielectric ceramic composition of the present invention, the components $V_2O_5$ and $Cr_2O_3$ reduce the percent change of the capacitance with respect to time. In the present invention, the components $V_2O_5$ and $Cr_2O_3$ is preferably added singly or compositely in an amount of 0.4 moles or less per 100 moles of barium calcium titanate. If the contents of the these two components are too high, the insulating resistance of the capacitor is greatly lowered. More preferably the two components are added singly or compositely in an amount of 0.05–0.3 moles per 100 moles of the barium calcium titanate.

In the dielectric composition of the present invention constituted as described above, the control of the rate of diffusion is easy in the shells within the dielectric layers improving the dielectric property remarkably. Accordingly, the large capacity multi-layer ceramic capacitor which is manufactured by using the dielectric composition of the present invention meets the X7R specification, and shows an average accelerated age of 60 hours or more and dielectric constant of more than 2,000.

Now the method for manufacturing the multi-layer ceramic capacitor according to the present invention will be described.

First, the above described dielectric ceramic powders are prepared, and then the powders are mixed together at a predetermined ratio. Then an organic binder is added to the mixture to form a slurry.

It is an unique features of the present invention to mix at least two or more kinds of such powders together and to carry out pre-calcination of the mixture. ibis pre-calcination makes the dielectric composition distribute more uniformly spread on the shells, thereby greatly decreasing the deviations of the dielectric properties of the capacitor compared with those that are manufactured by simply mixing such powders.

In the present invention, some kinds of the powders of the starting material may be calcinated, followed by the addition of the rest of other powders after the calcination. Or all kinds of the powders of starting material may be calcinated. The calcination is carried out at a temperature of 1000–1200° C. or preferably at a temperature of 1000–1100° C. If the calcinating temperature is too low, the calcination effect is insufficient, while if it is too high, the powders are melted to form glass.

Then the calcinated powders are crushed, and these crushed calcinated powders are mixed with barium calcium titanate. Then an organic binder is added to form a slurry.

Then this slurry is formed into green sheets.

Then one side of the green sheets are coated with Ni or an Ni alloy to form internal electrodes, and then the sheets with the internal electrodes are stacked as many times as required.

Then the dielectric layer sheets with the internal electrodes and the dielectric layer sheets without ones are alternately stacked together to form a Stacked chip. This stacked chip is sintered at a predetermined temperature under a reducing atmosphere, thereby obtaining a multi-layer ceramic chip. Under this condition, the sintering is preferably carried out at a temperature of 1250–1350° C.

Finally, a pair of external electrodes are formed on both sides of the chip in such a manner that the external electrodes should be electrically connected to the internal electrodes. The outer electrodes are formed in such a manner that a metal paste is spread on the both sides of the chip, and then a sintering or a baking is carries out.

In this manufacturing method, by using $BaCa_xTiO_3$ ($0<x\leqq0.02$) which has excellent anti-reduction property and controlling more advantageously the diffusion rate of the dielectric ceramic, it is possible to provide a multi-layer ceramic capacitor which satisfies the X7R specification, has excellent dielectric properties and furthermore has great reliability due to low deviations of the dielectric properties.

Now, the present invention will be described in more details based on concrete examples.

EXAMPLE 1

Powders having a purity of 99.5% or more were mixed together at a mixing ratio of 1 mole of $BaCO_3$, 0.001 moles of $CaCO_3$, and 1 mole of $TiO_2$, and barium calcium titanate (x=0.001) were obtained through the calcination of the mixed powders at a temperature of 1000–1200° C. for 2hrs.

The minor raw materials were added as shown in Table 1 below per 100 moles of barium calcium titanate, and then, a solvent such as a polyvinylbutyral based binder and ethanol was added, thereby forming a slurry.

TABLE 1

| Classification | Chemical composition (mole ratio) | | | | | | | |
|---|---|---|---|---|---|---|---|---|
| | MgO | MnO | BaO | CaO | $SiO_2$ | $Y_2O_3$ | $V_2O_5$ | $Cr_2O_3$ |
| Comp. material a | 2 | 0.1 | 0.5 | — | 2 | 1.0 | 0.07 | 0.2 |
| Comp. material b | 2 | 0.1 | 1.0 | — | 2 | 1.0 | 0.07 | 0.2 |
| Inv. material 1 | 2 | 0.1 | 0.5 | 0.5 | 2 | 1.0 | 0.07 | 0.2 |
| Inv. material 2 | 2 | 0.1 | 0.5 | 1.0 | 2 | 1.0 | 0.07 | 0.2 |
| Inv. material 3 | 2 | 0.1 | 1.0 | 1.0 | 2 | 1.0 | 0.07 | 0.2 |

The slurry was formed into sheets 20 μm thick, and Ni was printed on the sheets. Then 40 of these sheets were stacked to form a chip. Then the chips were heat-treated at a temperature of 230–320° C. to remove a part of the binder, and the chips thus hat-treated were sintered at a temperature of 1250–1350° C. for 2 hours. During the sintering, a gas mixture consisting of nitrogen, hydrogen and steam was used so that the Ni electrodes would not be oxidized.

Then the sintered chips were heat-treated at a temperature of 900–1100° C. Then the both sides of the chips were ground, and external electrodes were disposed on the both sides of the chip, thereby obtaining multi-layer ceramic capacitors. For these capacitors, tests were carried out on capacitance, insulating resistance, capacitance variation with respect to temperature, average accelerated age, and percent change with respect to time. The test result are shown in Table 2 below.

The capacitance was measured by using an LCR meter at the normal temperature and by applying an AC 1V of 1 KHz, while the insulating resistance was measured by applying a DC rated voltage of 50V for 10 seconds.

Further, the capacitance variation was measured by using the LCR meter and by varying the temperature between −55° C. and 125° C. and by applying an AC 1V of 1 KHz. The average accelerated age was calculated for 40 test pieces at a temperature of 125° C. by applying 400V. The capacitance variation with respect to time was calculated by dividing the capacitance variation amount by the initial capacitance after applying the rated voltage for 1000 hours at 40° C.

TABLE 2

| Classification | Dielectric constant | Insulating resistance (MΩ) | Average accelerated age (hr) | Variation with time (%) | X7R standard |
|---|---|---|---|---|---|
| Comp. example a | 3680 | Reduced | 0 | — | X |
| Comp. example b | 3105 | 244 | 0.503 | — | X |
| Inv. example 1 | 2674 | 7146.7 | 158.5 | −2.3 | Satisfied |
| Inv. example 2 | 2315 | 7905.7 | 185.4 | −2.7 | Satisfied |
| Inv. example 3 | 2492 | 7263.3 | 145.1 | −2.5 | Satisfied |

As can be seen in Table 2 above, the multi-layer ceramic capacitor according to the present invention not only met X7R secification of the EIA standard but also showed high insulating resistance. In particular, it showed a dielectric constant of 2000 or more and an average accelerated age of 150 hours or more.

EXAMPLE 2

Powders having a purity of 99.5% or more were mixed together at a mixing ratio of 1 mole of $BaCO_3$, 0.005 moles of $CaCO_3$, and 1 mole of $TiO_2$. Then the mixture was calcinated at a temperature of 1000–1200° C. for 2 hours, thereby obtaining barium calcium titanate (x=0.005).

Then minor raw materials were added at ratios shown in Table 3 per 100 moles of barium calcium titanate, and then multi-layer ceramic capacitors were manufactured in a manner same as that of Example 1. Then the characteristics of the capacitor were measured, and the measured results are shown in Table 4 below.

TABLE 4

| Classification | Dielectric constant | Insulating resistance, (MΩ) | Average accelerated age (hr) | Variation with time (%) | X7R standard |
|---|---|---|---|---|---|
| Inv. example 4 | 2656 | 7183 | 157.3 | −2.4 | Satisfied |
| Inv. example 5 | 2783 | 7059.8 | 107.8 | −3.1 | Satisfied |
| Inv. example 6 | 2691 | 7075.2 | 112.3 | −3.0 | Satisfied |
| Inv. example 7 | 2613 | 6585.3 | 98.7 | −3.1 | Satisfied |
| Inv. example 8 | 3127 | 6932.8 | 85.1 | −3.5 | Satisfied |
| Inv. example 9 | 2495 | 6985.1 | 97.5 | −3.2 | Satisfied |
| Inv. example 10 | 2981 | 4153.7 | 123.1 | −2.9 | Satisfied |
| Inv. example 11 | 2704 | 7351.8 | 137.0 | −2.6 | Satisfied |
| Inv. example 12 | 2697 | 7104.6 | 83.9 | −3.5 | Satisfied |
| Inv. example 13 | 2284 | 6823.3 | 79.5 | −3.6 | Satisfied |

As can be seen in Table 4 above, the multi-layer ceramic capacitor according to the present invention not only met X7R specification of the EIA standard but also showed high insulating resistance. In particular, it showed a dielectric constant of 2000 or more and an average accelerated age of 79 hours or more.

EXAMPLE 3

Powders having a purity of 99.5% or more were mixed together at a mixing ratio of 1 mole of $BaCO_3$, 0.01 moles of $CaCO_3$, and 1 mole of $TiO_2$. Then the mixture was Fascinated at a temperature of 1000–1200° C. for 2 hours, thereby obtaining barium calcium titanate (x=0.01).

TABLE 3

| | Chemical composition (mole %) | | | | | | | | | | |
|---|---|---|---|---|---|---|---|---|---|---|---|
| Classification | MgO | MnO | BaO | CaO | $SiO_2$ | $Y_2O_3$ | $Dy_2O_3$ | $Ho_2O_3$ | $Er_2O_3$ | $V_2O_5$ | $Cr_2O_3$ |
| Inv. material 4 | 2 | 0.1 | 0.5 | 0.1 | 2 | 1.0 | — | — | — | 0.07 | 0.2 |
| Inv. material 5 | 2 | 0.1 | 1.0 | 0.1 | 2 | 1.0 | — | — | — | 0.07 | 0.2 |
| Inv. material 6 | 2 | 0.1 | 0.5 | 0.5 | 2 | 1.0 | — | — | — | 0.07 | 0.2 |
| Inv. material 7 | 2 | 0.1 | 0.5 | 1.0 | 2 | 0.5 | — | — | — | 0.07 | 0.2 |
| Inv. material 8 | 2 | 0.1 | 1.0 | 1.0 | 2 | — | 1.0 | — | — | 0.07 | 0.2 |
| Inv. material 9 | 2 | 0.1 | 0.5 | 0.5 | 2 | — | 1.5 | — | — | 0.07 | 0.2 |
| Inv. material 10 | 2 | 0.1 | 0.5 | 0.5 | 2 | — | — | 1.0 | — | 0.07 | 0.2 |
| Inv. material 11 | 2 | 0.1 | 0.5 | 0.5 | 2 | — | — | 1.5 | — | 0.07 | 0.2 |
| Inv. material 12 | 2 | 0.1 | 0.5 | 0.5 | 2 | — | — | — | 1.0 | 0.07 | 0.2 |
| Inv. material 13 | 2 | 0.1 | 0.5 | 0.5 | 2 | — | — | — | 1.5 | 0.07 | 0.2 |

TABLE 5

| Classification | Chemical composition (mole %) | | | | | | | | | | |
| --- | --- | --- | --- | --- | --- | --- | --- | --- | --- | --- | --- |
| | MgO | MnO | BaO | CaO | $SiO_2$ | $Y_2O_3$ | $Dy_2O_3$ | $Ho_2O_3$ | $Er_2O_3$ | $V_2O_5$ | $Cr_2O_3$ |
| comp. material c | 2 | — | 0.5 | 0.1 | 2 | 1.0 | — | — | — | 0.07 | 0.2 |
| comp. material d | 2 | 0.1 | 0.5 | 0.1 | 2 | — | — | — | — | 0.07 | 0.2 |
| inv. material 14 | 2 | 0.1 | 0.5 | 0.1 | 2 | 1.0 | — | — | — | 0.07 | 0.2 |
| inv. material 15 | 2 | 0.1 | 0.5 | 0.5 | 2 | 1.0 | — | — | — | 0.07 | 0.2 |
| inv. material 16 | 1 | 0.1 | 0.5 | 0.1 | 2 | 1.0 | — | — | — | 0.07 | 0.2 |
| inv. material 17 | 4 | 0.1 | 0.5 | 0.1 | 2 | 1.0 | — | — | — | 0.07 | 0.2 |
| inv. material 18 | 2 | 0.05 | 0.5 | 0.1 | 2 | 1.0 | — | — | — | 0.07 | 0.2 |
| inv. material 19 | 2 | 0.2 | 0.5 | 0.1 | 2 | 1.0 | — | — | — | 0.07 | 0.2 |
| inv. material 20 | 2 | 0.1 | 0.5 | 0.1 | 2 | 0.5 | — | — | — | 0.07 | 0.2 |
| inv. material 21 | 2 | 0.1 | 0.5 | 0.1 | 2 | 2.0 | — | — | — | 0.07 | 0.2 |
| inv. material 22 | 2 | 0.1 | 0.5 | 0.1 | 2 | 1.0 | — | — | — | — | 0.2 |
| inv. material 23 | 2 | 0.1 | 0.5 | 0.1 | 2 | 1.0 | — | — | — | 0.2 | 0.2 |
| inv. material 24 | 2 | 0.1 | 0.5 | 0.1 | 2 | 1.0 | — | — | — | 0.4 | 0.2 |
| inv. material 25 | 2 | 0.1 | 0.5 | 0.1 | 2 | 1.0 | — | — | — | 0.07 | — |
| inv. material 26 | 2 | 0.1 | 0.5 | 0.1 | 2 | 1.0 | — | — | — | 0.07 | 0.4 |
| inv. material 27 | 2 | 0.1 | 0.5 | 0.1 | 2 | — | 1.0 | — | — | 0.07 | 0.2 |
| inv. material 28 | 2 | 0.1 | 0.5 | 0.1 | 2 | — | 1.5 | — | — | 0.07 | 0.2 |
| inv. material 29 | 2 | 0.1 | 0.5 | 0.1 | 2 | — | — | 1.0 | — | 0.07 | 0.2 |
| inv. material 30 | 2 | 0.1 | 0.5 | 0.1 | 2 | — | — | 1.5 | — | 0.07 | 0.2 |
| inv. material 31 | 2 | 0.1 | 0.5 | 0.1 | 2 | — | — | — | 1.0 | 0.07 | 0.2 |
| inv. material 32 | 2 | 0.1 | 0.5 | 0.1 | 2 | — | — | — | 1.5 | 0.07 | 0.2 |
| inv. material 33 | 2 | 0.1 | 0.5 | 0.1 | 2 | 1.0 | — | — | — | — | — |

TABLE 6

| Classification | Dielectric constant | Insulating resistance (MΩ) | Average accelerated age (hr) | Change with time (%) | X7R standard |
| --- | --- | --- | --- | --- | --- |
| comp. example c | 2944 | 315.7 | 0.581 | — | Satisfied |
| comp. example d | 2465 | 2567.3 | 6.9 | — | Satisfied |
| inv. example 14 | 2702 | 7099.4 | 168.5 | −2.2 | Satisfied |
| inv. example 15 | 2489 | 7034.5 | 121.1 | −2.9 | Satisfied |
| inv. example 16 | 3139 | 5390.0 | 131.3 | −2.7 | Satisfied |
| inv. example 17 | 2518 | 7814.4 | 144.5 | −2.5 | Satisfied |
| inv. example 18 | 2616 | 4482.5 | 133.0 | −2.7 | Satisfied |
| inv. example 19 | 2587 | 8900.1 | 133.7 | −2.7 | Satisfied |
| inv. example 20 | 2645 | 6761.7 | 132.3 | −2.7 | Satisfied |
| inv. example 21 | 2691 | 7324.9 | 172.4 | −2.1 | Satisfied |
| inv. example 22 | 2599 | 5958.6 | 90.8 | −3.2 | Satisfied |
| inv. example 23 | 2702 | 7052.1 | 89.7 | −3.4 | Satisfied |
| inv. example 24 | 2645 | 6969.6 | 120.9 | −3.0 | Satisfied |
| inv. example 25 | 2656 | 4479.2 | 69.7 | −3.9 | Satisfied |
| inv. example 26 | 2639 | 7034.5 | 108.3 | −3.0 | Satisfied |
| inv. example 27 | 3115 | 7008.5 | 90.4 | −3.3 | Satisfied |
| inv. example 28 | 2492 | 6857.0 | 98.2 | −3.1 | Satisfied |
| inv. example 29 | 2859 | 4307.9 | 119.8 | −3.0 | Satisfied |
| inv. example 30 | 2715 | 7348.1 | 148.6 | −2.4 | Satisfied |
| inv. example 31 | 2690 | 7086.4 | 90.8 | −3.2 | Satisfied |
| inv. example 32 | 2197 | 6905.0 | 88.1 | −3.4 | Satisfied |
| inv. example 33 | 2655 | 5813.2 | 60.1 | −5.2 | Satisfied |

As can be seen in Table 6 above, the multi-layer ceramic capacitor according to the present invention not only met X7R specification of the EIA but also showed high insulating resistance. In particular, it showed a dielectric constant of 2000 or more and an average accelerated age of 60 hours or more.

EXAMPLE 4

Powders having a purity of 99.5% or more were mixed together at a mixing ratio of 1 mole of $BaCO_3$, 0.02 moles of $CaCO_3$, and 1 mole of $TiO_2$. Then the mixture was calcinated at a temperature of 1000–1200° C. for 2 hours, thereby obtaining barium calcium titanate (x=0.02).

The minor raw materials were added at the ratios shown in Table 7 per 100 moles of barium calcium titanate, and then a PVB based binder was added, thereby forming a slurry. Then multi-layer ceramic capacitors were manufactured in the same method as that of Example 1, and for the capacitors thus manufactured, their properties were measured, the measured results being shown in Table 8 below.

TABLE 7

| Classifica-tion | Chemical composition (mole %) | | | | | | | |
|---|---|---|---|---|---|---|---|---|
| | MgO | MnO | BaO | CaO | SiO$_2$ | Y$_2$O$_3$ | V$_2$O$_5$ | Cr$_2$O$_3$ |
| inv. material 34 | 2 | 0.1 | 0.5 | 0.1 | 2 | 1.0 | 0.07 | 0.2 |

TABLE 8

| Classification | Dielectric constant | Insulating resistance (MΩ) | Average accelerated age (hr) | Change with time (%) | X7R standard |
|---|---|---|---|---|---|
| inv. example 34 | 2339 | 8581.1 | 73.6 | −3.7 | Satisfied |

As can be seen in Table 8 above, the multi-layer ceramic capacitor according to the present invention not only met X7R specification of the EIA standard but also high insulating resistance. In particular, it showed a dielectric constant of 2000 or more, and an average accelerated age of 70 hours or more.

This slurry was formed into sheets 20 μm thick, and Ni was printed on the sheets to form internal electrodes. A sintering was carried out to prepare chips with a capacitance of 100 nF, considering the dielectric constant of each composition. The prepared chips were heat-treated at a temperature of 230–320° C. to remove a part of the binder. Then these chips were sintered at a temperature of 1250–1350° C. for 2 hours.

During the sintering, a gas mixture of nitrogen, hydrogen and steam was used so that the Ni electrodes would not be oxidized. Then this sintered chips were heat-treated at a temperature of 900–1100° C. Then the both sides of the chips were ground, and then external electrodes were disposed on the both sides of the chips, thereby forming multi-layer ceramic capacitors. For these capacitors, capacitance, capacitance loss and insulating resistance were measured, and the measured results are shown in Table 9 below.

The capacitance and the capacitance loss were measured by using an LCR meter by applying an AC 1V of 1 KHz at the normal temperature, while the insulating resistance was measured by applying the rated voltage 50V for 10 seconds.

TABLE 9

| Classification | Dielectric material | Capacitance (nF) | | Capacitance loss (%) | | Insulating resistance (MΩ) | | Remarks |
|---|---|---|---|---|---|---|---|---|
| | | Average | Standard Deviation | Average | Standard Deviation | Average | Standard Deviation | |
| inv. example 1a | inv. material 1 | 103.9 | 5.00 | 1.42 | 0.17 | 7517 | 912 | Simple mix |
| inv. example 1b | | 104.9 | 3.65 | 1.33 | 0.20 | 7203 | 835 | Partly calcination |

As can be seen in Table 9 above, the multi-layer ceramic capacitor according to the present invention met X7R of the EIA standard, and showed low deviations in capacitance, in dielectric loss and in insulating resistance compared with the case where the minor raw materials were simply mixed.

EXAMPLE 5

Powders having a purity of 99.5% or more were mixed together at a mixing ratio of 1 mole of BaCO$_3$, 0.001 moles of CaCO$_3$, and 1 mole of TiO$_2$. Then the mixture was calcinated at a temperature of 1100° C. for 2 hours, thereby obtaining barium calcium titanate.

Among the minor raw materials, only the components MgO, BaO, CaO and SiO$_2$ were mixed together at the same ratio as that of the inventive material 1 per 100 moles of the prepared barium calcium titanate. This mixture was calcinated in advance at a temperature of 1050° C. for 2 hours, and then the calcinated powders were crushed. These crushed powders were mixed with the remaining non-calcinated components and the barium calcium titanate, and a solvent such as polyvinylbutyral based binder and ethanol were added to form a slurry.

EXAMPLE 6

Powders having a purity of 99.5% or more were mixed together at a mixing ratio of 1 mole of BaCO$_3$, 0.005 moles of CaCO$_3$, and 1 mole of TiO$_2$. Then the mixture was calcinated at a temperature of 1100° C. for 2 hours, thereby obtaining barium calcium titanate (x=0.005). Then multi-layer ceramic capacitors were formed based on the same method as that of Example 5, except the case where the minor raw materials were simply mixed at the mixing ratio of the inventive material 4 per 100 moles of the barium calcium titanate, and except the case where a part of them were calcinated. For the capacitors thus manufactured, capacitance, dielectric loss and insulating resistance were measured, and the measured results are shown in Table 10 below.

TABLE 10

| Classification | Dielectric material | Capacitance (nF) Average | Capacitance (nF) S deviation | Dielectric loss (%) Average | Dielectric loss (%) S deviation | Insulating resistance (MΩ) Average | Insulating resistance (MΩ) S deviation | Remarks |
|---|---|---|---|---|---|---|---|---|
| inv. example 4a | inv. material 4 | 106.4 | 5.34 | 1.41 | 0.11 | 7495 | 1473 | Simple mix |
| inv. example 4b | | 105.2 | 3.11 | 1.40 | 0.10 | 7549 | 1053 | Partly calcinated |

As can be seen in Table 10 above, the multi-layer ceramic capacitor in which some kinds of the minor raw materials were calcinated met X7R of the EIA standard, and showed low deviations in capacitance, in dielectric loss and in insulating resistance compared with the case where the minor raw materials were simply mixed.

EXAMPLE 7

Multi-layer ceramic capacitors were formed based on a method same as that of Example 6, except the case where the minor raw materials were simply mixed at the mixing ratio of the inventive material 10 per 100 moles of the barium calcium titanate ($x=0.005$), and except the case where all kinds of them were calcinated. For the capacitors thus manufactured, capacitance, dielectric loss and insulating resistance were measured, and the measured results are shown in Table 11 below.

TABLE 11

| Classification | Dielectric material | Capacitance (nF) Average | Capacitance (nF) S deviation | Dielectric loss (%) Average | Dielectric loss (%) S deviation | Insulating resistance (MΩ) Average | Insulating resistance (MΩ) S deviation | Remarks |
|---|---|---|---|---|---|---|---|---|
| inv. example 10a | inv. material 10 | 104.8 | 5.10 | 1.39 | 0.18 | 5571 | 1313 | Simple mix |
| inv. example 10b | | 107.3 | 3.76 | 1.39 | 0.14 | 6229 | 1037 | all calcinatd |

As can be seen in Table 11 above, the multi-layer ceramic capacitor in which all the minor raw materials were calcinated met X7R of the EIA standard, and showed low deviations in capacitance, in dielectric loss and in insulating resistance compared with the case where the minor raw materials were simply mixed.

EXAMPLE 8

Powders having a purity of 99.5% or more were mixed together at a mixing ratio of 1 mole of $BaCO_3$, 0.001–0.005 moles of $CaCO_3$, and 1 mole of $TiO_2$. Then the mixture was calcinated at a temperature of 1100° C. for 2 hours, thereby obtaining barium calcium titanate ($x=0.001$–$0.005$). Then multi-layer ceramic capacitors were formed based on the same method as that of Example 5, except the case where the minor raw materials were simply mixed at the mixing ratio of Table 12 per 100 moles of barium calcium titanate, and except the case where some or all kinds of them were calcinated. For the capacitors thus manufactured, capacitance, dielectric loss and insulating resistance were measured, and the measured results are shown in Table 13 below.

TABLE 12

| Classification | Chemical composition (Mole ratio) | | | | | | | | | | | |
|---|---|---|---|---|---|---|---|---|---|---|---|---|
| | $BaCa_xTi$ | MgO | MnO | BaO | CaO | $SiO_2$ | $Y_2O_3$ | $Dy_2O$ | $Ho_2O$ | $Er_2O$ | $V_2O_5$ | $Cr_2O_3$ |
| inv. material 35 | $x = 0.001$ | 1 | 0.1 | 0.5 | 0.5 | 2 | 1.0 | — | — | — | 0.07 | 0.2 |
| inv. material 36 | $x = 0.005$ | 4 | 0.1 | 0.5 | 0.1 | 2 | 1.0 | — | — | — | 0.07 | 0.2 |
| inv. material 37 | $x = 0.005$ | 2 | 0.1 | 0.5 | 0.5 | 2 | — | 1.0 | — | — | 0.07 | 0.2 |

TABLE 13

| Classification | Dielectric material | Capacitance (nF) Average | Capacitance (nF) S deviation | Dielectric loss (%) Average | Dielectric loss (%) S deviation | Insulating resistance (MΩ) Average | Insulating resistance (MΩ) S deviation | Remarks |
|---|---|---|---|---|---|---|---|---|
| inv. Exam. 35a | inventive material 34 | 103.6 | 4.58 | 1.53 | 0.17 | 7181 | 1420 | Simple mix |
| inv. Exam. 35b | | 103.1 | 3.26 | 1.33 | 0.20 | 7203 | 835 | Partly calcination |

TABLE 13-continued

| Classification | Dielectric material | Capacitance (nF) | | Dielectric loss (%) | | Insulating resistance (MΩ) | | Remarks |
|---|---|---|---|---|---|---|---|---|
| | | Average | S deviation | Average | S deviation | Average | S deviation | |
| inv. Exam. 36a | inventive material 35 | 102.9 | 5.85 | 1.48 | 0.18 | 7188 | 2052 | Simple mix |
| inv. Exam. 36b | | 101.4 | 3.42 | 1.39 | 0.10 | 7363 | 930 | Partly calntn |
| inv. Exam. 37a | inventive material 36 | 107.5 | 4.79 | 1.40 | 0.14 | 6243 | 1526 | Simple mix |
| inv. Exam. 37b | | 104.8 | 2.92 | 1.39 | 0.14 | 5974 | 860 | All calcination |

As can be seen in Table 13 above, the multi-layer ceramic capacitor which was manufactured by calcining some or all kinds of the minor raw materials satisfied X7R of the EIA standard, and was low in the deviations of capacitance, dielectric loss and insulating resistance. That is, in the case where the dielectric powders including barium calcium titanate was partly calcined or wholly calcined, the composition of the dielectric shell could be uniformly distributed, with the result that the deviations in the dielectric properties of the capacitor could be greatly reduced.

According to the present invention as described above, by using $BaCa_xTiO_3(0<x\leq0.02)$ which has excellent anti-reduction property and controlling more advantageously the diffusion rate of the dielectric ceramic, it is possible to provide a multi-layer ceramic capacitor with Ni internal electrodes which satisfies X7R specification and has excellent dielectric properties and furthermore has great reliability due to low deviations of the dielectric properties.

What is claimed is:

1. A dielectric ceramic composition comprising:
   100 moles of barium calcium titanate $BaCa_xTiO_3$ ($0.001\leq x\leq0.02$),
   0.5–4 moles of MgO,
   0.01–0.5 moles of MnO,
   0.1–2 moles of BaO,
   0.1–2 moles of CaO,
   1–4 moles of $SiO_2$ and
   0.1–3 moles of at least one or more compounds selected from the group consisting of $Y_2O_3$, $Dy_2O_3$, $Ho_2O_3$ and $Er_2O_3$.

2. The dielectric ceramic composition as claimed in claim 1, wherein the amount of MgO is about 0.5–3 moles per 100 moles of barium calcium titanate.

3. The dielectric ceramic composition as claimed in claim 1, wherein the amount of MnO is about 0.05–0.2 moles per 100 moles of barium calcium titanate.

4. The dielectric ceramic composition as claimed in claim 1, wherein the amount of BaO is about 0.5–1.5 moles per 100 moles of barium calcium titanate.

5. The dielectric ceramic composition as claimed in claim 1, wherein the amount of CaO is about 0.5–1.5 moles per 100 moles of barium calcium titanate.

6. The dielectric ceramic composition as claimed in claim 1, wherein the amount of $SiO_2$ is about 1.5–3 moles per 100 moles of barium calcium titanate.

7. The dielectric ceramic composition as claimed in claim 1, wherein the Amount of at least one or more components selected from the group consisting of $Y_2O_3$, $Dy_2O_3$, $Ho_2O_3$ and $Er_2O_3$ respectively are about 0.5–2 moles.

8. The dielectric ceramic composition as claimed in claim 1, wherein the amount of $V_2O_5$ and/or $Cr_2O_3$ are about 0.4 moles or more.

9. The dielectric ceramic composition as claimed in claim 8, wherein the amount Of $V_2O_5$ and/or $Cr_2O_3$ are about 0.05–0.3 moles.

10. A multi-layer ceramic capacitor comprising:
    a plurality of dielectric ceramic layers;
    a plurality of internal electrodes disposed on said dielectric ceramic layers, said internal electrodes and said dielectric ceramic layers being alternately stacked to form a stacked chip; and
    a pair of outer electrodes formed on both sides of said stacked chip;
    wherein said dielectric ceramic layers comprise a dielectric ceramic composition which comprises 100 moles of barium calcium titanate $BaCa_xTiO_3$ ($0.001\leq x\leq0.02$), 0.5–4 moles of MgO, 0.01–0.5 moles of MnO, 0.1–2 moles of BaO, 0.1–2 moles of CaO, 1–4 moles of $SiO_2$ and 0.1–3 moles of at least one or more compounds selected from the group consisting of $Y_2O_3$, $Dy_2O_3$, $Ho_2O_3$ and $Er_2O_3$.

11. The multi-layer ceramic capacitor as claimed in claim 10, wherein said internal electrode layers are made of Ni or an Ni alloys.

12. The multi-layer ceramic capacitor as claimed in claim 10, wherein the capacitor has an average accelerated age of at least 60 hours, and has a dielectric constant of at least 2000 or more.

13. The multi-layer ceramic capacitor as claimed in claim 10, where in said dielectric ceramic composition further comprise about 0.05–0.3 moles of $V_2O_5$ and/or $Cr_2O_3$.

14. The multi-layer ceramic capacitor as claimed in claim 13, wherein the capacitor has an average accelerated age of at least 60 hours, and has a dielectric constant of at least 2000 or more.

15. A method for manufacturing a multi-layer ceramic capacitor comprising the steps of:
    preparing ceramic powders comprising
       0.5–4 moles of MgO,
       0.01–0.5 moles of MnO,
       0.1–2 moles of BaO,
       0.1–2 moles of CaO,
       1–4 moles of $SiO_2$ and
       0.1–3 moles of at least one or more compounds selected from the group consisting of $Y_2O_3$, $Dy_2O_3$, $Ho_2O_3$ and $Er_2O_3$,
       per 100 moles of barium calcium titanate $BaCa_xTiO_3$ ($0.001\leq x\leq0.02$), wherein at least two or more kinds of said ceramic powders are mixed and calcinated;
    crushing the calcinated powders, mixing said calcinated powders and remaining powders with barium calcium titanate, and adding a binder and a solvent so as to form a slurry;
    forming said slurry into a plurality of sheets, and printing Ni or an Ni alloys onto some of said sheets so as to form internal electrodes;

stacking alternately the sheets with and without the internal electrodes, whereby a stacked chip is formed, and sintering said chip; and disposing a pair of external electrodes on both sides of said stacked chip so as to be connected to said internal electrodes, whereby a multi-layer ceramic capacitor with a low deviation of dielectric properties is formed.

16. The method as claimed in claim 15, wherein the powders are calcinated at a temperature of about 1000–1200° C.

17. The method as claimed in claim 15, wherein the stacked chip is sintered at a temperature of about 1250–1350° C.

18. The method as claimed in claim 15, wherein further comprises about 0.05–0.3 moles of $V_2O_5$ and/or $Cr_2O_3$ in the mixed powders.

19. The method as claimed in claim 15, wherein all of said ceramic powders are calcinated.

20. The method as claimed in claim 15, wherein the capacitor has an average accelerated age of at least about 60 hours, and has a dielectric constant of at least about 2000 or more.

21. A multi-layer ceramic capacitor as claimed in claim 10, having an insulating resistance of at least 4000 MΩ and a dielectric constant of at least 2000.

* * * * *